(12) United States Patent
Goel et al.

(10) Patent No.: US 8,396,713 B2
(45) Date of Patent: Mar. 12, 2013

(54) METHOD AND SYSTEM FOR USING A STATISTICAL LANGUAGE MODEL AND AN ACTION CLASSIFIER IN PARALLEL WITH GRAMMAR FOR BETTER HANDLING OF OUT-OF-GRAMMAR UTTERANCES

(75) Inventors: Vaibhava Goel, Elmsford, NY (US); Ramesh Gopinath, Millwood, NY (US); Ea-Ee Jan, Ardsley, NY (US); Karthik Visweswariah, Briarcliff Manor, NY (US)

(73) Assignee: Nuance Communications, Inc., Burlington, MA (US)

( * ) Notice: Subject to any disclaimer, the term of this patent is extended or adjusted under 35 U.S.C. 154(b) by 1262 days.

(21) Appl. No.: 11/742,149

(22) Filed: Apr. 30, 2007

(65) Prior Publication Data

US 2008/0270135 A1    Oct. 30, 2008

(51) Int. Cl.
*G10L 15/00*   (2006.01)

(52) U.S. Cl. ........ 704/257; 704/246; 704/247; 704/251; 704/252; 704/255

(58) Field of Classification Search .................. None
See application file for complete search history.

(56) References Cited

U.S. PATENT DOCUMENTS

| | | | |
|---|---|---|---|
| 7,124,081 B1 * | 10/2006 | Bellegarda | 704/255 |
| 7,149,695 B1 * | 12/2006 | Bellegarda | 704/275 |
| 7,228,275 B1 * | 6/2007 | Endo et al. | 704/235 |
| 2002/0107690 A1 * | 8/2002 | Souvignier | 704/251 |
| 2005/0038650 A1 * | 2/2005 | Bellegarda et al. | 704/231 |
| 2005/0055210 A1 * | 3/2005 | Venkataraman et al. | 704/255 |
| 2005/0256710 A1 * | 11/2005 | Pankert et al. | 704/235 |
| 2006/0074631 A1 * | 4/2006 | Wang et al. | 704/9 |
| 2006/0080107 A1 * | 4/2006 | Hill et al. | 704/275 |
| 2008/0015846 A1 * | 1/2008 | Acero et al. | 704/201 |

OTHER PUBLICATIONS

Chen and J. Goodman, "An empirical study of smoothing techniques for language modeling.", in Tech. Rep. TR-10-98, Center for Research in Computing Technology, Harvard University, MA, 1998.
Zhang and F.J. Oles, "Text Categorization Based on Regularaized Linear Classification Methods", Journal of Information Retrieval, vol. 4, No. 1, pp. 5-31, Kluwer Academic Publishers, 2001.
G. Riccardi, et al.,"Language model adaptation for spoken language systems," in Proc. ICSLP 1998, Sydney, Australia, Dec. 1998.

* cited by examiner

*Primary Examiner* — Leonard Saint Cyr
(74) *Attorney, Agent, or Firm* — Wolf, Greenfield & Sacks, P.C.

(57) ABSTRACT

A method (and system) of handling out-of-grammar utterances includes building a statistical language model for a dialog state using, generating sentences and semantic interpretations for the sentences using finite state grammar, building a statistical action classifier, receiving user input, carrying out recognition with the finite state grammar, carrying out recognition with the statistical language model, using the statistical action classifier to find semantic interpretations, comparing an output from the finite state grammar and an output from the statistical language model, deciding which output of the output from the finite state grammar and the output from the statistical language model to keep as a final recognition output, selecting the final recognition output, and outputting the final recognition result, wherein the statistical action classifier, the finite state grammar and the statistical language model are used in conjunction to carry out speech recognition and interpretation.

9 Claims, 2 Drawing Sheets

METHOD AND SYSTEM FOR USING A STATISTICAL LANGUAGE MODEL AND AN ACTION CLASSIFIER IN PARALLEL WITH GRAMMAR FOR BETTER HANDLING OF OUT-OF-GRAMMAR UTTERANCES

BACKGROUND OF THE INVENTION

1. Field of the Invention

The present invention generally relates to speech recognition systems, and more particularly to a method and apparatus for handling out-of-grammar utterances in a spoken conversation.

2. Description of the Related Art

In transactional ASR applications, to carry out speech recognition at a dialog state one often uses a finite state grammar (FSG) as the model of language for the state. However, it is frequently found that grammar designed for a dialog state does not cover everything that users actually say at that state. The present invention addresses the problem of handling the user utterances that are not covered by the grammar (out-of-grammar (OOG) utterances).

For out-of-grammar utterances, the desirable system behavior is to accept, and interpret, utterances that are meaningful for the dialog state, and reject those that are not. When using grammar for recognition, it is very hard to achieve correct acceptance and interpretation because ASR on such sentences using the grammar produces unreliable hypotheses with unreliable confidence scores.

Some known approaches for handling out-of-grammar utterances include use of a background model made from words, phones, or states of the ASR acoustic model. However, these approaches only try to improve rejection of the OOG sentences without regard to sentences that may be meaningful for the state and should not be rejected.

SUMMARY OF THE INVENTION

In view of the foregoing and other exemplary problems, drawbacks, and disadvantages of the conventional methods and structures, an exemplary feature of the present invention is to provide a method and structure to handle out-of-grammar utterances (OOG) using a statistical language model in parallel with an action classifier.

In accordance with a first aspect of the present invention, a method (and system) of handling out-of-grammar utterances includes building a statistical language model for a dialog state using data that is collected when users interact with the dialog state, generating sentences and semantic interpretations for the sentences using finite state grammar, building a statistical action classifier using the data set containing sentences and the associated semantic interpretations, receiving user input, carrying out recognition with the finite state grammar, carrying out recognition with the statistical language model, using the statistical action classifier to find semantic interpretations, comparing an output from the finite state grammar and an output from the statistical language model, deciding which output of the output from the finite state grammar and the output from the statistical language model to keep as a final recognition output, selecting the final recognition output, and outputting the final recognition result, wherein the statistical action classifier, the finite state grammar and the statistical language model are used in conjunction to carryout speech recognition and interpretation.

The present invention addresses the limitations of the conventional approaches and presents a technique that aims at accepting OOG sentences that are meaningful for the dialog state and rejecting only those that are out of domain.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
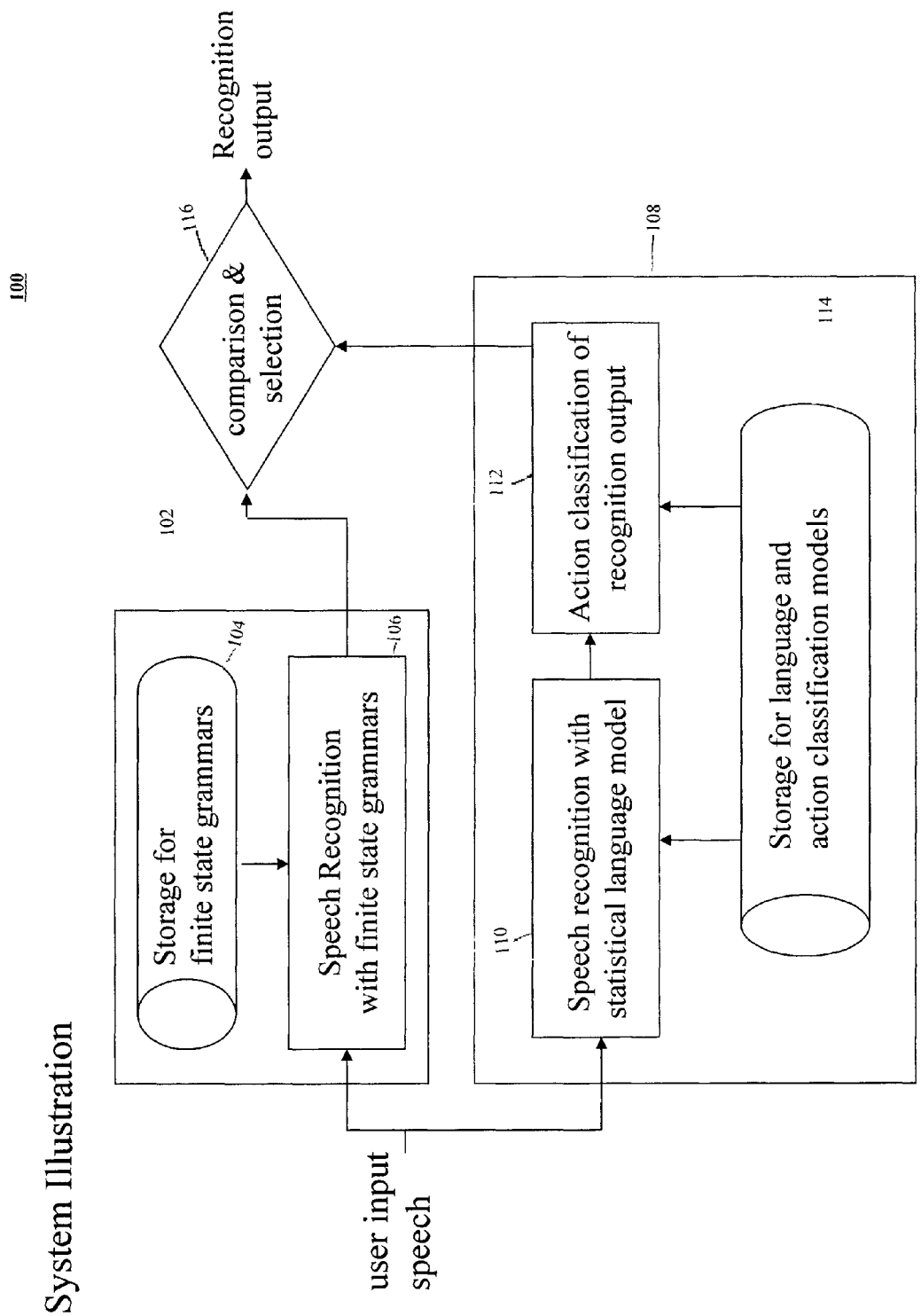
FIG. 1 illustrates a system 100 in accordance with an exemplary embodiment of the present invention.
Figure 2:
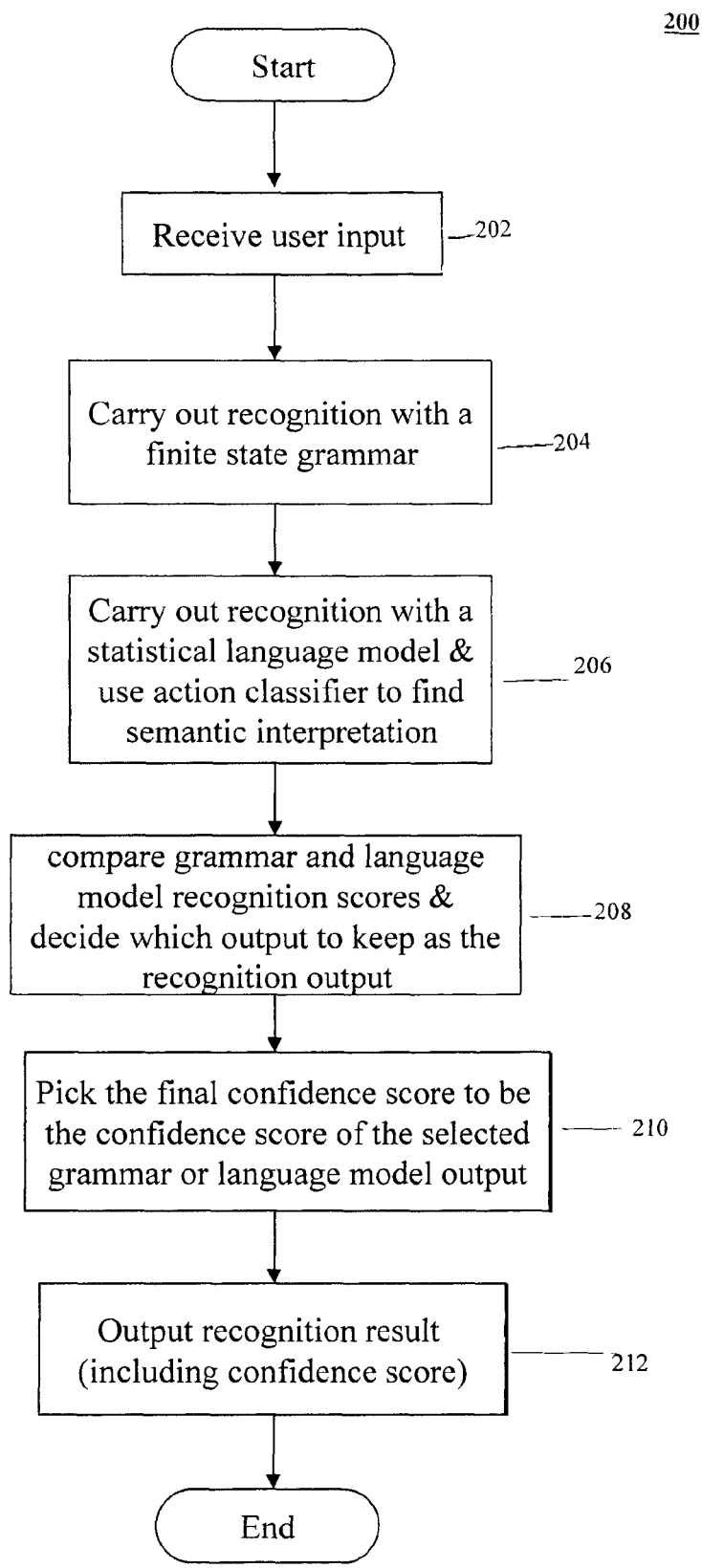
FIG. 2 illustrates a method 200 in accordance with an exemplary embodiment of the present invention.

Referring now to the drawings, and more particularly to FIGS. 1 and 2, there are shown exemplary embodiments of the method and structures according to the present invention.

Certain embodiments of the present invention are directed to a method (and system) of using a statistical language model and an action classifier in parallel with grammar for a better understanding of out-of-grammar utterances.

The present invention uses a statistical language model (SLM) and a statistical action classifier (SAC) in conjunction with finite state grammar to carry out speech recognition and interpretation. This way, user utterances that are not in the grammar would still be recognized by the SLM and they will be assigned an interpretation using the SAC. The dialog state can then take this additional information provided by SLM and SAC into consideration and make a decision on how to handle the user input.

For example, consider a dialog state where users are expected to pick whether they are calling about their bill or their minutes of use. Also, for the sake of illustration, assume that the FSG used for recognition at that state contains the following sentences along with the tags as shown

| | |
|---|---|
| "bill" | tag = bill |
| "my bill" | tag = bill |
| "I am calling about my bill" | tag = bill |
| "my bill please" | tag = bill |
| "minutes" | tag = minutes |
| "minutes of use" | tag = minutes |
| "my minutes" | tag = minutes |
| "how many minutes have I used" | tag = minutes |

At this state, if a user says "my, um, my bill please" it is likely that this sentence would be rejected as it is not one of the sentences allowed by the FSG. However, using an SLM and carrying out recognition on this utterance, the system may recognize "my my bill please." This recognition output could be easily understood to be related to bill and could easily be tagged like this using an appropriately trained SAC.

For a given finite state grammar, there are several ways in which the SLM and SAC can be designed and used at recognition time.

In accordance with an exemplary embodiment of the present invention, a method of building the recognition SLM for a dialog state uses the data that is collected when actual users interact with that dialog state in the deployed system. With such interaction data an SLM can be built using any known SLM building approach.

An alternative SLM is an SLM that may already be used at another dialog state in the application. For example, in an alternative approach (results presented below), there is an open ended main-menu dialog state that allows people to speak freely and use an SLM for recognition. If people are not able to successfully provide an input they are taken to a back-off state which provides them with options for what they could say and uses a FSG for recognition. In the proposed strategy of the present method, for the back-off dialog state, the SLM to use could be the SLM that was used as the main-menu state.

Another alternative SLM to use is an SLM that is constructed using some generic (non application specific) data that expects to cover frequently spoken words and utterances.

If the SLM used is not built from the actual data collected from usage of the dialog state in consideration, as in the two alternative approaches mentioned above, the SLM could be adapted once there is some actual usage data available.

For building the SAC an exemplary method is to first use the FSG to generate sentences along with their semantic interpretation. Such sentence generation should be done utilizing the sentence probabilities assigned by the FSG. Accordingly, the sentences that are more likely in the FSG would have a higher count in the generated corpus. Once the data set containing sentences and associated semantic interpretations is created, any known SAC training procedures can be used to create the statistical action classifier.

An exemplary method, in accordance with the present invention, for using the SLM and SAC in conjunction with FSG is to carry out two recognition passes on user utterance; one using the grammar and second using the statistical language model. The recognition scores (constructed from both the acoustic model score and language model score) for the two passes are compared and if the score from the language model recognition pass is higher, by more than a threshold, than the score from the grammar recognition, then the language model recognition output is selected. Otherwise the grammar recognition output is selected.

If the grammar output is selected, the interpretation is obtained along with recognition. The confidence score in this case is also taken to be the confidence score obtained in the grammar recognition pass. For the language model output, the interpretation is obtained using the statistical action classifier, and the confidence is taken to be the confidence score from the language model recognition pass.

There are several alternatives possible for carrying out recognition in a single pass or multiple passes, for deciding on which recognition output (SLM or FSG) to keep, and to obtain the confidence score for the semantic interpretation finally produced. For instance, a single recognition pass strategy could be adopted by combining the SLM and FSG into one joint model which would be used to carry out recognition. The threshold that was used in the multi-pass strategy could be built into the joint model to bias the recognition towards or away from the SLM.

In an exemplary experiment of the present invention, the method was carried out on a deployed application that receives over 10 million customer calls every month. The present method was tested on the aforementioned back-off state which employs directed dialog and uses an FSG to carry out recognition. Callers reach this state in case they have trouble navigating at the main-menu state which uses an SLM to carry out recognition.

At the back-off state, two pass recognition was carried out; once using the FSG and once using the SLM. The SLM was same as that used at the main-menu; it was built with data collected at main-menu. In these experiments the SLM was not adapted using data collected at the back-off state.

The SAC was built on data generated from the FSG, as discussed above.

For the back-off state 34% (of approximately 5500 sentences) of user utterances were not in the FSG. These OOG utterances were manually analyzed and 42.6% of these were found to be in-domain and it is these sentences that are expect to be handled better (correctly recognize and semantically interpret).

Table 1 (shown below) shows, in the first row, the false accept (FA)—false reject (FR) performance of the baseline system which uses only the FSG for recognition. The second row shows the FA-FR performance obtained with using the SLM+SAC in conjunction with the SLM. In this table, the In-domain column gives the fraction of sentences that are in-domain, CA-in are sentences that are in-domain and correctly accepted, shown as a fraction of the total number of sentences. FA-in are in-domain sentences that are falsely accepted and FR-in are in-domain sentences that are falsely rejected. CR-out are the correctly rejected out-of-domain sentences and FA-out are the falsely accepted out-of-domain sentences. The last column, FA+FR, gives the total error rate.

From this table it may be noted that with the method (and system) of the present invention there is a significant gain in CA-in and significant drop in FR-in. There is a slight increase in FA-in but that may not be significant, or if it is it can be controlled by raising the rejection threshold. Overall, the present invention provides more than 10% relative reduction in the total FA+FR error rate.

TABLE 1

|  | In-domain | CA-in | FA-in | FR-in | Out-of-domain | CR-out | FA-out | FA + FR |
|---|---|---|---|---|---|---|---|---|
| Baseline | 78.5% | 60.1% | 4.1% | 14.2% | 21.5% | 18.3% | 3.2% | 21.6% |
| capture in-domain | 78.5% | 63.0% | 4.3% | 11.2% | 21.5% | 18.3% | 3.2% | 18.8% |

FIG. 1 illustrates a system 100 in accordance with certain exemplary embodiments of the present invention. The system includes a finite state grammar unit 102, which includes a storage unit for finite state grammars 104 and a speech recognition unit with finite state grammars 106, and a language and action classification model unit 108, which includes a speech recognition with statistical language model unit 110, an action classification unit 112 and a storage for language and action classification models unit 114. The speech recognition units 106, 110 receive user input speech.

The output from the finite grammar unit 102 and the language and action classification model unit 108 are transferred to a comparison and selection unit 116, which compares the respective outputs. The comparison and selection unit 116 generates a recognition output based on the comparison of the respective outputs.

FIG. 2 illustrates a method 200 in accordance with certain exemplary embodiments of the present invention. The method includes receiving user input 202, carrying out recognition with a finite state grammar 204, carrying out recognition with a statistical language model and using a classifier to find a semantic interpretation 206, comparing the grammar and language model recognition scores and deciding which output to keep as the recognition output 208, selecting the final confidence score to be the confidence score of the selected grammar or language model output 210, and outputting a recognition result 212, which includes the confidence score.

A typical hardware configuration of an information handling/computer system in accordance with the invention preferably has at least one processor or central processing unit (CPU).

The CPUs are interconnected via a system bus to a random access memory (RAM), read-only memory (ROM), input/output (I/O) adapter (for connecting peripheral devices such as disk units and tape drives to the bus), user interface adapter (for connecting a keyboard, mouse, speaker, microphone, and/or other user interface device to the bus), a communication adapter for connecting an information handling system to a data processing network, the Internet, an Intranet, a personal area network (PAN), etc., and a display adapter for connecting the bus to a display device and/or printer (e.g., a digital printer or the like).

In addition to the system and method described above, a different aspect of the invention includes a computer-implemented method for performing the above method. As an example, this method may be implemented in a computer system environment.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU and hardware above, to perform the method of the invention.

This signal-bearing media may include, for example, a RAM contained within the CPU, as represented by the fast-access storage for example. Alternatively, the instructions may be contained in another signal-bearing media, such as a magnetic data storage diskette, directly or indirectly accessible by the CPU. Whether contained in the diskette, the computer/CPU, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A method of handling an utterance, the method comprising:
   carrying out recognition of the utterance with a finite state grammar;
   carrying out recognition of the utterance with a statistical language model built for a dialog state using data collected from user interactions with the dialog state;
   using a statistical action classifier to find at least one semantic interpretation of the utterance;
   using at least one processor, comparing a first result of the recognition of the utterance with the finite state grammar and a second result of the recognition of the utterance with the statistical language model; and
   deciding which of the first result and the second result to keep as a final recognition result including:
   selecting the first result, for output, as the final recognition result if a confidence score of the first result of the recognition of the utterance with the finite state grammar is greater than a confidence score of the second result of the recognition of the utterance with the statistical language model, and
   selecting the second result, for output, as the final recognition result if the confidence score of the second result of the recognition of the utterance with the statistical language model is greater than the confidence score of the first result of the recognition of the utterance with the finite state grammar.

2. The method according to claim 1, wherein, when the confidence score of the second result is greater than the confidence score of the first result by a value greater than a threshold, selecting said final recognition result comprises selecting the second result.

3. The method of claim 1, wherein the statistical action classifier is built using data containing sentences and associated semantic interpretations generated using the finite state grammar.

4. An apparatus comprising:
   at least one processor programmed to perform a method of handling an utterance, the method comprising:
   carrying out recognition of the utterance with a finite state grammar;
   carrying out recognition of the utterance with a statistical language model built for a dialog state using data that is collected from user interactions with the dialog state;
   using a statistical action classifier to find at least one semantic interpretation of the utterance; and
   comparing a first result of the recognition of the utterance with the finite state grammar and a second result of the recognition of the utterance with the statistical language model to select, for output, a final recognition result, wherein the first result is selected, for output, as the final recognition result if a confidence score of the first result of the recognition of the utterance with the finite state grammar is greater than a confidence score of the second result of the recognition of the utterance with the statistical language model, and wherein the second result is selected, for output, as the final recognition result if the confidence score of the second result of the recognition of the utterance with the statistical language model is greater than the confidence score of the first result of the recognition of the utterance with the finite state grammar.

5. The apparatus according to claim 4, wherein, when the confidence score of the second result is greater than the confidence score of the first result by a value greater than a threshold, selecting the final recognition result comprises selecting the second result.

6. The apparatus of claim 4, wherein the statistical action classifier is built using data containing sentences and associated semantic interpretations generated using the finite state grammar.

7. At least one tangible computer-readable storage medium encoded with computer-executable instructions that, when executed by a computer, perform a method of handling an utterance, the method comprising:
- carrying out recognition of the utterance with a finite state grammar;
- carrying out recognition of the utterance with a statistical language model built for a dialog state using data that is collected from user interactions with the dialog state;
- using a statistical action classifier to find at least one semantic interpretation of the utterance; and
- comparing a first result of the recognition of the utterance with the finite state grammar and a second result of the recognition of the utterance with the statistical language model to select, for output, a final recognition result, wherein the first result is selected, for output, as the final recognition result if a confidence score of the first result of the recognition of the utterance with the finite state grammar is greater than a confidence score of the second result of the recognition of the utterance with the statistical language model, and wherein the second result is selected, for output, as the final recognition result if the confidence score of the second result of the recognition of the utterance with the statistical language model is greater than the confidence score of the first result of the recognition of the utterance with the finite state grammar.

8. The at least one tangible computer-readable storage medium according to claim 7, wherein, when the confidence score of the second result is greater than the confidence score of the first result by a value greater than a threshold, selecting the final recognition result comprises selecting the second result.

9. The at least one tangible computer-readable storage medium of claim 7, wherein the statistical action classifier is built using data set containing sentences and associated semantic interpretations generated using the finite state grammar.

* * * * *